INVENTOR.
JOHN G. LORD
BY [signature]
ATTORNEY.

Dec. 3, 1963   J. G. LORD   3,112,872
VOTING MACHINE
Filed June 20, 1961   6 Sheets-Sheet 2

INVENTOR.
JOHN G. LORD
BY
ATTORNEY.

Dec. 3, 1963  J. G. LORD  3,112,872
VOTING MACHINE

Filed June 20, 1961  6 Sheets-Sheet 3

INVENTOR.
JOHN G. LORD
BY
ATTORNEY.

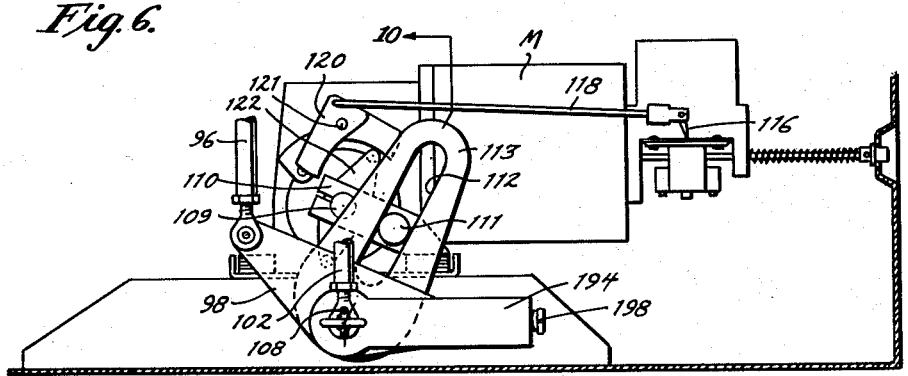
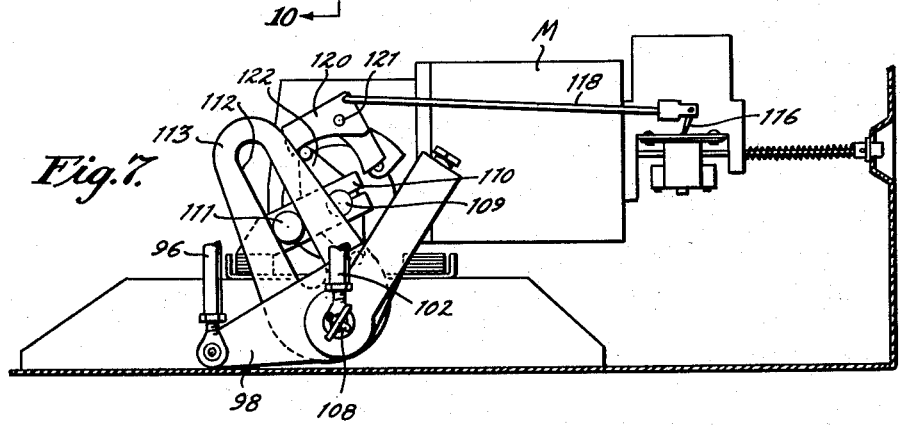
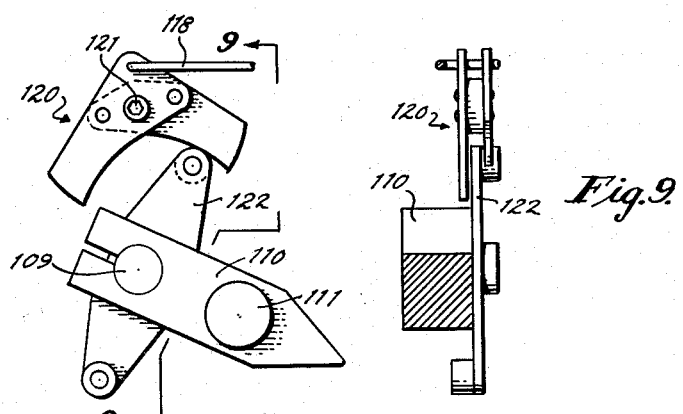

Dec. 3, 1963 J. G. LORD 3,112,872
VOTING MACHINE
Filed June 20, 1961 6 Sheets-Sheet 5
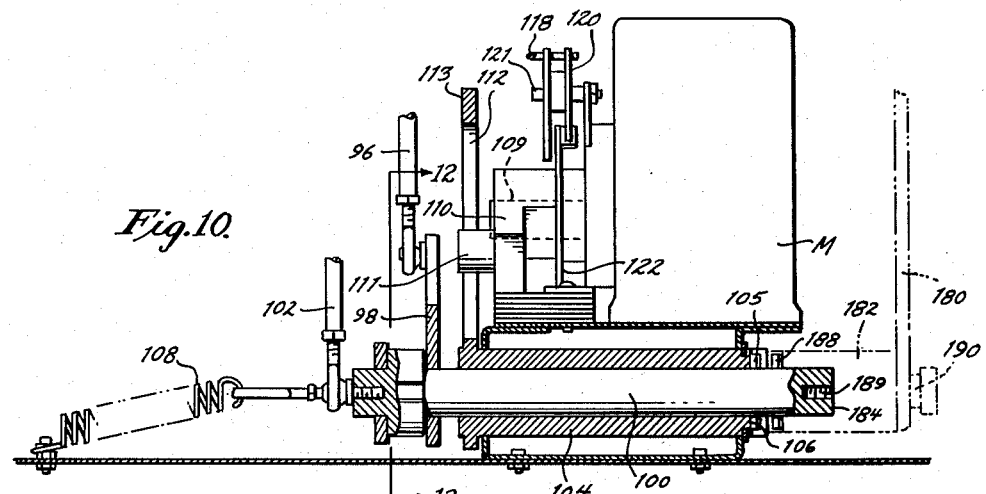
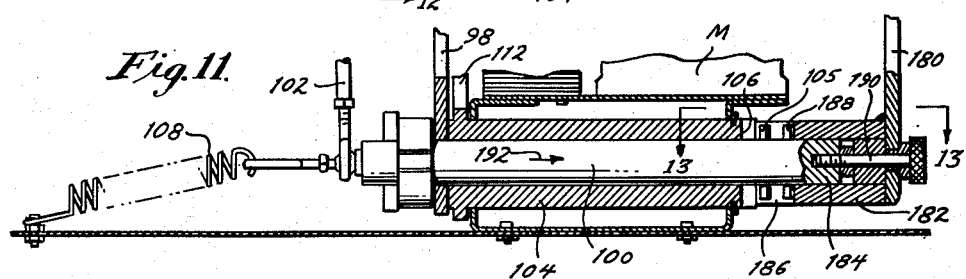
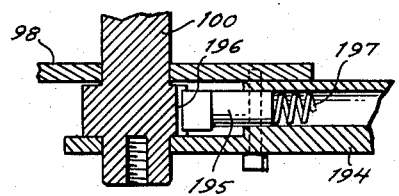
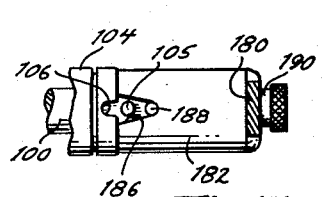
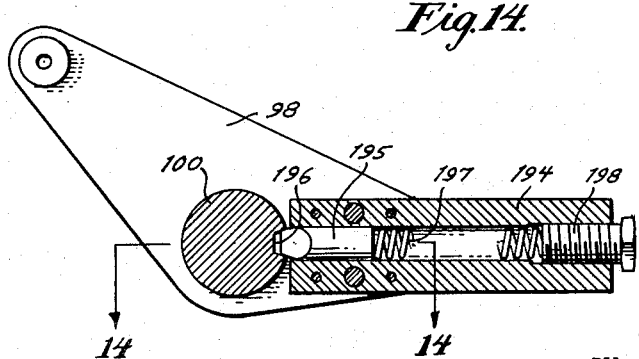
INVENTOR.
JOHN G. LORD
BY
ATTORNEY.

Dec. 3, 1963    J. G. LORD    3,112,872
VOTING MACHINE
Filed June 20, 1961    6 Sheets-Sheet 6

INVENTOR.
JOHN G. LORD
BY
ATTORNEY.

United States Patent Office 3,112,872
Patented Dec. 3, 1963

3,112,872
VOTING MACHINE
John G. Lord, Swarthmore, Pa., assignor to Shoup Research & Development Corporation, Ridley Park, Pa.
Filed June 20, 1961, Ser. No. 118,383
6 Claims. (Cl. 235—55)

This invention relates to a voting machine of the type shown in Shoup Patents Nos. 2,054,102, 2,251,254 and 2,826,356.

One object of the invention is to produce an improved voting machine of the type set forth.

A machine of the type set forth includes a curtain for closing the voting booth; means for opening and closing the curtain, vote counters, voting spindles having handles (30 in Patent 2,054,102) by which they are rotatable in vote-casting direction, and back; a spindle handle restoring frame (in Patents 2,054,102 and 2,251,254), or individual handle return members (in Patent 2,826,356), which are movable upwardly with rotation of the voting spindles in vote-casting direction and which are moved downwardly to restore, or re-set, the voting spindles, and means (bar 54 in Patent 2,054,102), which is movable upwardly and laterally to engage said counters with the voting spindles to record a vote when the voting spindles are turned in vote-casting direction, said bar being movable downwardly to release or disengage said counters to prevent reverse rotation of the voting spindles upon reverse movement of the voting spindles by the downward movement of the return members which resets the voting spindles for use by the next voter.

For a full understanding of the structure and operation of the voting machine generally, and of bar 54 specifically, reference may be had to the above mentioned patents. For the purpose of the present disclosure, it is only necessary to point out that bar 54 has heretofore been raised and lowered by means of stud 70 which engages cam slot 58a in cam bar 58. See, for example, FIG. 1 of Patent 2,251,254.

Cam bar 58 has been used very successfully for many years and in thousands of full sized voting machines. But, with the increasing use of voting machines for elections in smaller political sub-divisions; in local labor unions, and in various other organizations where the number of officers and the number of contenders is relatively small, compact machines which have only three or four columns of voting spindles, instead of nine or ten, will suffice. For such compact machines, the standard, horizontally reciprocable cam bar 58 above referred to is not wholly satisfactory because the length of the bar and the space required for its horizontal movement make it impossible to reduce the width of the machine as may be otherwise possible. Furthermore, reciprocation of bar 58 necessitates overcoming weight and friction.

It is therefore a further object of the invention to produce improved machines in which a rotary quadrant is substituted for cam bar 58 to facilitate operation and to permit reduction of the width of the machine to the minimum required by the number of columns of voting spindles.

In FIGS. 12 and 20 of Patent 2,826,356, there are shown a number of individual voting spindle handle return members 10 which are locked against vertical movement when their associated rollers 18 ride on flats 20 formed on slide bar 22 and which can be moved vertically when said rollers 18 engage notches 24 in said bar 22. As explained in said patent, the handle return members are engageable with the voting spindles and therefore the voting spindles cannot be turned as long as the handle return members are immobilized, and vice versa. The manner in which this is accomplished forms no part of the present invention and is therefore not shown nor described. It is sufficient to point out that in Patent 2,826,356, bar 22 is moved to handle return member locking and releasing positions by a main cam bar 64 which corresponds to main cam bar 58 of Patent 2,251,254.

It is therefore a still further object of the invention to produce an improved machine in which bar 22 of Patent 2,826,356 is reciprocated horizontally by the same rotary quadrant which reciprocates bar 54 of the other mentioned patents vertically.

In some communities, electricity may not be available and it is possible for electricity to become unavailable during the course of an election.

For convenience in identifying the present with past disclosures, parts 10, 18, 20, 22 and 24 herein correspond to the similarly numbered parts in Patent 2,826,356, and part 54 herein corresponds to part 54 of Patent 2,251,254.

It is therefore a still further object of the invention to produce a voting machine which embodies the present invention and which is operable manually or automatically.

The full nature of the invention is set forth in the following specification and the accompanying drawings in which:

FIG. 6 is a front elevational view of the lower part of FIG. 1 showing the parts in one extreme position thereof.

FIG. 7 is similar to FIG. 6, but showing the parts in the opposite extreme position.

FIG. 8 is an enlarged, fragmentary view of some of the parts shown at the top left portion of FIG. 6.

FIG. 9 is a sectional view looking in the direction of line 9—9 on FIG. 8.

FIG. 10 is a sectional view looking in the direction of line 10—10 on FIG. 6 showing the mechanism adapted for motor operation.

FIG. 11 is similar to FIG. 10, but showing the parts adapted for manual operation.

FIG. 12 is an enlarged, fragmentary, sectional view looking in the direction of line 12—12 on FIG. 10.

FIG. 13 is an enlarged, sectional view looking in the direction of line 13—13 on FIG. 11.

FIG. 14 is a sectional view looking in the direction of line 14—14 on FIG. 12.

Figure 5:
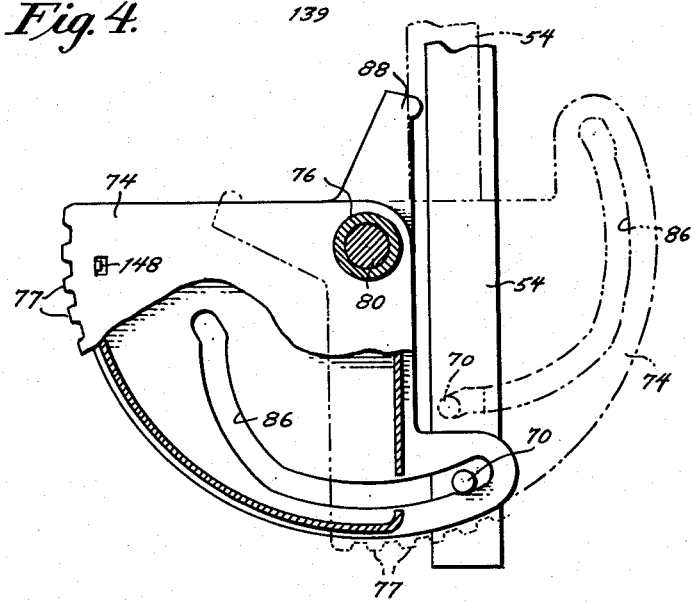
FIG. 5 is a view, partly in section, and, partly in elevation, looking in the direction of line 5—5 on FIG. 2, certain parts being broken away and other parts being omitted.

According to this invention, cam bar 58 of Patent 2,251,254 is replaced by a quadrant 74 which is fixed on hollow shaft 76 and is provided with teeth 77. Shaft 76 is journalled for rotation in a bearing, or opening, 78 in a fixed portion 79 of the frame of the machine, and is extended, or is provided with extension 80 which is secured to shaft 76 by pin 81 engaging openings 82 in shaft 76 and in extension 80. Extension 80 is journalled for rotation in a fixed plate or bracket 84, and fixedly carries crank arm 85 which will be hereinafter referred to. Gear quadrant 74 is provided with a cam slot 86 which is engageable with pin 70 at the lower end of bar 54 (of Patent 2,054,102). It will be readily seen from FIGS. 1 and 5 that clockwise rotation of quadrant 74 engages pin 70 with the low portion of slot 86 and moves bar 54 to its low, solid line of FIG. 5 and that counter-clockwise rotation of the quadrant engages pin 70 with the high portion of slot 86 and raises bar 54. The movement of bar 54 engages and disengages the vote counters, as set forth in the prior patents and for the purpose of this disclosure, it is only necessary to point out that the solid line position of the quadrant in FIG. 5 corresponds to the curtain-open position of the voting machine and that the position of the quadrant in FIG. 15 corresponds to the curtain-closed position of voting machine.

Figure 3:
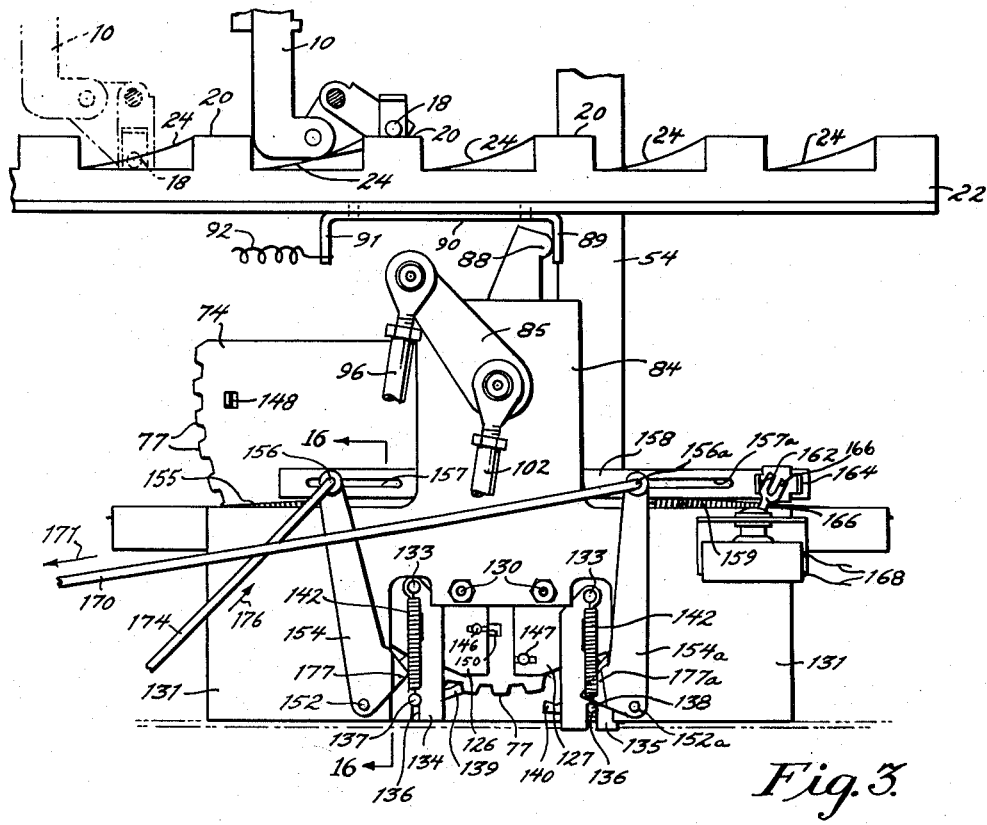
FIG. 3 is an enlarged, sectional view looking in the direction of line 3—3 on FIG. 2 and showing one position of the parts.

It will be remembered that in Patent 2,826,356, bar 22 is movable to a position in which rollers 18 of the handle-return members 10 ride on elevated flats 20 to lock the handle-return members and into another position in which rollers 18 ride on lower surfaces 24 to release the handle return members 10 and, hence, the voting spindles. In order to use the quadrant of the present invention for moving bar 22 to its handle-return member locking position, the quadrant is provided with a finger 88 which, as best shown in FIG. 3, is adapted to engage one wall 89 of an inverted U-shaped bracket 90 which is secured to bar 22 and the other wall 91 of which is connected to a spring 92 which, when not restrained by finger 88 of quadrant 74, biases the bar to the left, or to the position shown in FIG. 15. By this arrangement, when quadrant 74 is rotated, in clockwise direction, or to the curtain-open position of FIGS. 1, 3 and 4, finger 88 engages wall 89 of bracket 90 and moves slide bar 22 to the right, against the action of spring 92, or to the solid line position of FIG. 3 in which rollers 18 of handle-return members 10 ride on flats 20 and immobilize voting spindles (S in Patent 2,826,356) in the manner explained in said patent. When quadrant 74 is moved, in counter-clockwise direction, or to the curtain-closed position which is shown in broken lines in FIG. 5 and in solid lines in FIG. 15, finger 88 moves out of the way and spring 92 moves slide bar 22 to the left to bring notches 24 into registration with rollers 18 of the handle-return members, or to the position shown in broken lines in FIG. 3, and in solid lines in FIG. 15, to release the voting spindles. It will be noted that because bar 22 need only be moved, in either direction, to an extent equal to the width of one flat 20 which need only be one inch, more or less, and because this limited horizontal movement is effected by the rotary movement of gear 74 it is possible to limit the width of the voting machine according to the number of columns of voting spindles to be installed in the machine. Since the manner in which the booth-closing curtain is opened and closed forms no part of the present invention, it is not disclosed. It is thought enough to say that the curtain may be opened and closed in the manner disclosed in one, or another, of the prior Shoup patients, as long as the voting spindles are immobilized when the curtain is opened and are released for use by a voter when the curtain is closed.

From the foregoing, it will be seen that, broadly stated, the invention resides in replacing the relatively long cam bar 58 of Shoup 2,251,254 (or cam bar 64 of Shoup Patent 2,826,356) with rotary gear 74 which, as above pointed out, makes it possible to reduce the width of the machine to the minimum required by the number of columns of voting spindles used and so as to facilitate operation of the machine and to reduce its overall weight.

In the embodiment illustrated, gear 74 is rotated by means of link 96, the upper end of which is connected to crank 85, and the lower end of which is connected to crank 98 which is carried by shaft 100. For stability, a tie rod 102 is pivotally connected to shaft extension 80 and to shaft 100. But, since rod 102 serves no other purpose, it will not be further referred to.

Shaft 100 is free to rotate in a sleeve 104, but can be keyed to said sleeve by engagement of pin 105 on the shaft with a recess or notch 106 formed in the adjacent end of the sleeve, as shown in FIGS. 10, 11 and 13. Shaft 100 is normally biased to the left, as viewed in FIGS. 1, 10, 11 and 13, to engage pin 105 with slot 106 by spring 108 which is connected to shaft 100 and to a fixed position, not shown, of the frame of the machine. This means that unless it is forcibly disengaged, shaft 100 will rotate whenever sleeve 104 is rotated. Sleeve 104 is rotated by a reversible motor M, the shaft 109 of which carries a crank 110 which carries a pin 111 which engages cam slot 112 in arm 113, which is fixed on sleeve 104. By this arrangement, reverse rotation of motor shaft 109 reciprocates arm 113 and sleeve 104 between the positions of FIGS. 6 and 7 and, through pin 105 and notch 106, reversely rotates shaft 100 to reciprocate crank 98 and, hence, link 96 which reciprocates crank 85 and quadrant 74.

To control the operation of motor M, I provide a three-pole, two-position switch 116 which, when thrown in one direction, de-energizes the motor and sets the electrical connections to cause the motor to reverse direction when next energized, and vice versa. Switch 116 and the reversing motor are conventional and are wired in any conventional manner and are, therefore, not shown, nor described. It is sufficient to point out that the contact arm of the switch is reciprocated by a link 118 which is connected to a bell crank 120 which is pivoted at 121 to the motor casing, or other fixed support, and which is engageable by crank 122, which is fixed on motor shaft 109, FIG. 8. By this arrangement, when motor shaft 109 is turned in one direction, it engages crank 122 with one arm of bell crank 120 and moves link 118 to the right, as viewed in FIG. 6, to de-energize the motor and to reverse the electrical connections to reverse the direction of the rotation of the motor. When the motor is again energized, link 118 will be moved to the left, as viewed in FIG. 7, again to energize motor M and to re-set the electrical connections, and so on.

Motor M can be energized and de-energized by manually actuating switch 116, or its equivalent. But in order to give the election officer and the voter mutually dependent and complementary control of the operation of the machine, I prefer to use the mechanism best shown in FIGS. 3, 4 and 15, which places the closing of the curtain, and the consequent release of the voting mechanism, under the control of the election officer and places the opening of the curtain, and the consequent locking of the voting machine, in the hands of the voter.

As best shown in the figures referred to, the control mechanism includes plates 126 and 127 which are provided, respectively, with cam slots 128 and 129, and are pivoted, at 130, to a pendent extension 131 of bracket 84. To plates 126 and 127 are secured, as at 133, a pair of arms 134 and 135 which are provided with slots 136 for receiving pins 137 and 138 on pawls 139 and 140, respectively. Pawls 139 and 140 are constantly biased upwardly by springs 142 which engage pins 137 and 138, FIG. 8. In addition, plate 126 is biased in counter-clockwise direction by spring 143 and plate 127 is biased in clockwise direction by spring 144. Plates 126 and 127 are provided with adjustable stops 146 and 147 which are adapted to be engaged by stops 148 and 150 on the adjacent face of gear quadrant 74 for a purpose hereinafter set forth.

Figure 2:
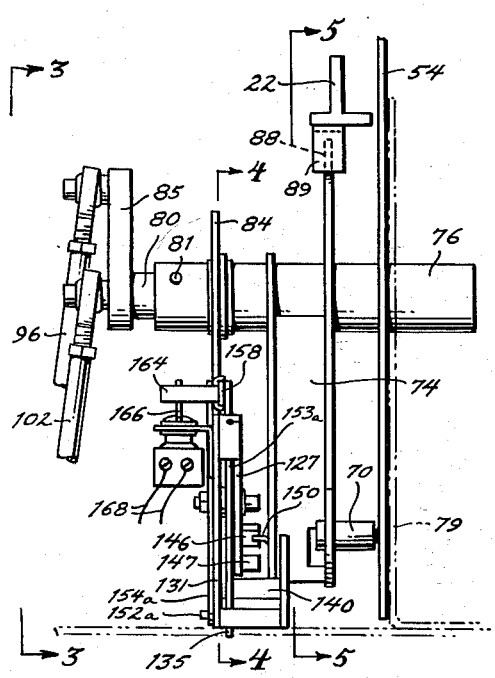
FIG. 2 is a side elevational view showing the parts at the top of FIG. 1 assembled.
Figure 15:
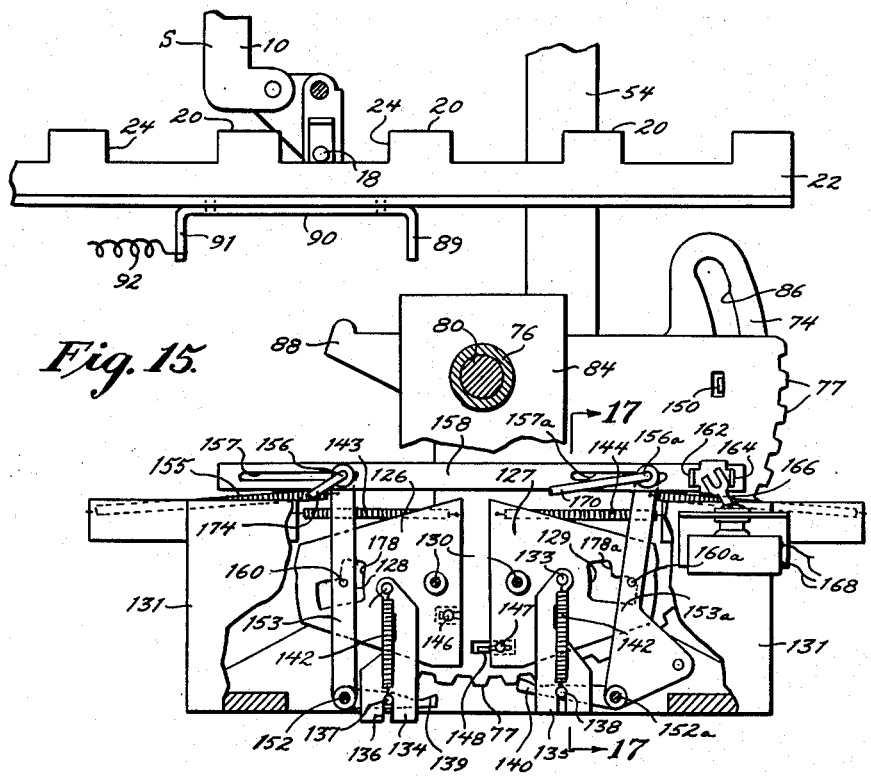
FIG. 15 is similar to FIG. 3, but showing the parts in the reversed position.
Figures 16, 17:
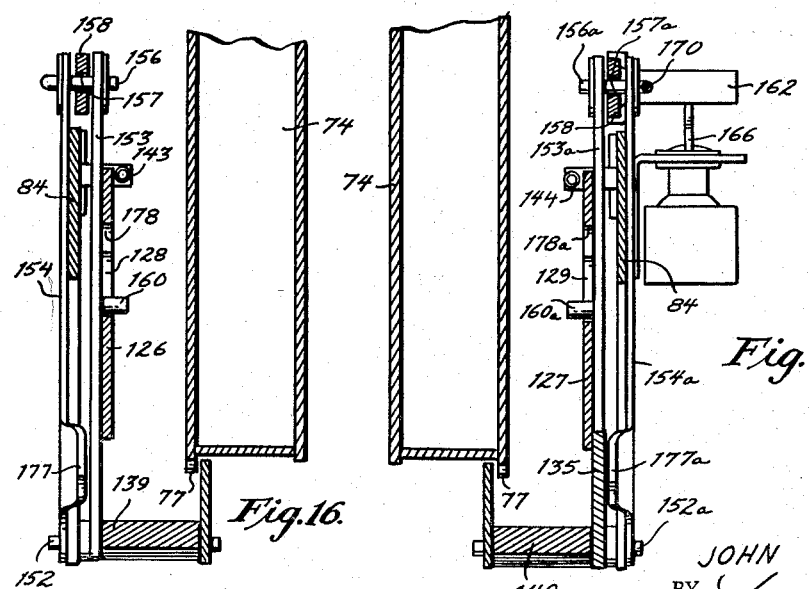
FIG. 16 is a sectional view looking in the direction of line 16—16 on FIG. 3.
FIG. 17 is a sectional view looking in the direction of line 17—17 on FIG. 15.

To the left portion of extension 131 of bracket 84 are pivoted, as at 152, the lower ends of inner arm 153 and of outer arm 154. FIG. 2. The upper ends of said arms carry a pin 156 which passes through slot 157 in slide 158 and is biased to the left by spring 155. To the right portion of extension 131 of bracket 84 are pivoted, as at 152a, the lower ends of a similar pair of inner arms 153a and outer arm 154a. The upper ends of said arms carry a pin 156a which passes through slot 157a in slide 158 and is biased to the right by spring 159. Inner arms 153 and 153a, respectively, carry pins 160 and 160a which engage cam openings 128 and 129 in plate 126 and 127, respectively, for a purpose hereinafter set forth. FIG. 15. Slide 158 carries lugs 162 and 164 which are adapted to move two-position switch 166 to the right, or to the left, as viewed in FIGS. 3, 4 and 15. Switch 166 is conventional and is therefore not shown in detail. It is thought sufficient to say that switch 166 is connected, by wires 168, to motor M, after the manner of switches of this kind, so as to energize the motor in either of its positions.

Figure 4:
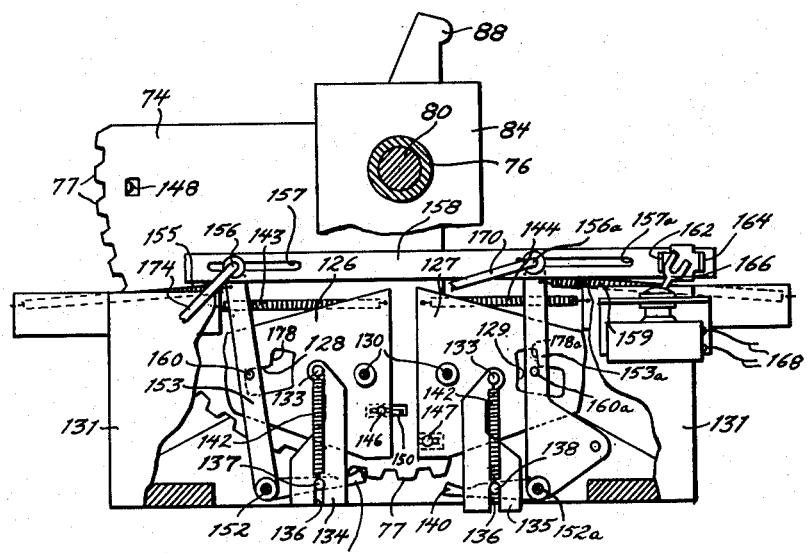
FIG. 4 is a sectional view looking in the direction of line 4—4 on FIG. 2, certain parts being broken away.

As best shown in FIGS. 3 and 4, arm 154 is provided with a cam 177 and cam slot 128 is provided with an upper recess 178 and arm 154a is provided with a similar cam 177a and recess 129 is provided with a similar upper recess 178a. By this arrangement, if arms 153 and 154 are rotated, in clockwise direction, as viewed in these figures, cam 177 on outer arm 154 will press downwardly on pin 137. This rotates plate 126 and brings pin 160 into registration with upper recess 178 of cam slot 128 in plate 126, as shown in FIG. 15. Depression of pin 137 lowers pawl 139 and of engagement with teeth 77 of gear quadrant 74 to permit clockwise rotation of the gear, or from the position of FIG. 15 to the position of FIG. 4. Movement of pin 160 into registration with upper recess 178 permits plate 126 to move downwardly as it rotates in a counter-clockwise direction in response to the action of spring 143. FIG. 4. Downward movement of the left end of plate 126 lowers arm 134 to the position of FIG. 15 to keep pawl 139 out of engagement with teeth 77 of the gear as long as pin 160 is engaged with recess 178 of cam slot 128, as shown in FIG. 4. Pin 160 remains in recess 178 of cam slot 128 until stop 150 on gear 74 engages adjustable stop 146 and rotates plate 126 in clockwise direction to raise the left end of plate 126 enough to permit pin 160 to clear recess 178. This allows plate 126 to be rotated in counter-clockwise direction by spring 143 to lift arm 134 and permit spring 142 to pull pin 134 and, hence, pawl 139 upwardly until the pawl engages teeth 77 of gear 74. It is noted that in its upper position, pawl 139 will prevent clockwise, but will not prevent counter-clockwise, rotation of gear 74 and since the gear has been rotated in clockwise direction as far as it will go, pawl 139 has no function and is only in position for the next cycle.

To rotate the gear from the position of FIG. 4 to the position of FIG. 15, arms 153a and 154a are rotated in counter-clockwise direction to depress pin 138 and pawl 140 and permit counter-clockwise rotation of gear 74. Movement of arms 153 and 154 as described brings pin 160a into registration with recess 178a of cam slot 129 so that, when the plate is rotated in clockwise direction in response to the action of spring 144, pin 160a will enter notch 178a and will permit the right end of plate 127 to move down and depress pin 138 and pawl 140 in the manner set forth in connection with arms 153 and 154.

Rotation of arms 153a and 154a in counter-clockwise direction is effected by pulling link 170 in the direction of arrow 171. This link is accessible from outside the voting booth so as to be operated by an election officer and is therefore referred to as the officer's link, or handle. Movement of arms 153 and 154 in clockwise direction is effected by pushing link 174 in the direction of arrow 176. This link is accessible from inside the voting booth so as to be operated by the voter and is therefore referred to as the voter's link, or handle.

The machine as above described operates automatically in the sense that actuation of the officer's handle 170, or of the voter's handle 174, merely serves to trip switch 166, which in turn energizes motor M which reciprocates gear quadrant 74 through link 96 and the other intervening parts, and which, through the conventional mechanism shown in the Shoup patents, also opens and closes the curtain.

For use where electric power is not available, or to insure that the machine can continue to be used in the event of power failure during an election, I provide means for readily converting from motor to manual operation. As best illustrated in FIGS. 10 to 14, I provide a handle 180 which is provided with a sleeve 182, which is adapted to be slipped over the end 184 of shaft 100 which projects beyond the end of sleeve 104. Sleeve 182 is provided with recess 186 which is adapted to be engaged by pin 188 which is provided at the end 184 of shaft 100 immediately outwardly of previously mentioned pin 105. The application of sleeve 182 to the end 184 of shaft 100 and the engagement of pin 188 with recess 186 integrate shaft 100 with handle 180 and permit reciprocation of gear quadrant 74 by means of handle 180. But, in order not to have to overcome the inertia of the motor, I provide shaft 100 with a tapped opening 189 and I provide sleeve 182 with screw 190, the arrangement being such that when screw 190 is engaged with tapped opening 189 and turned in one direction, shaft 100 will move in the direction of arrow 192 to withdraw pin 105 from slot 106 and further to move pin 188 into recess 186. This frees shaft 100 from sleeve 104 and therefore shaft 100 can be reciprocated by handle 180 wholly independently of motor shaft 109. By turning screw 190 in the reverse direction, shaft 100 can be re-integrated with sleeve 84. It will be appreciated that screw 190 may be turned, in either direction, without having to touch any other part of the machine. In other words, the machine can be converted from power, to manual operation, by a simple screw driver.

In order to guard against damage to the parts, crank 98 is loose on shaft 100 and is integrated with the shaft by means of a sliding pin 195 which is carried by housing 194 and notch 196 in shaft 100. Housing 194 is carried by crank 98 so as to be movable therewith. Since, in the absence of pin 195, crank 98 can turn freely on shaft 100 it follows that the force with which crank 98 is integrated with shaft 100 depends on the strength of spring 197 which is adjustable by screw 198.

As is well known, an electric motor continues to run for a time after it is de-energized, or until it loses its momentum and, in the prior patents, an involved brake mechanism was used to arrest the motor shaft which moved main cam bar (58, or 64) or which actuated some other part. A brake of the type referred to is not easily adjustable to exact and critical degree required for the operation of a voting machine. Also, the brake tends to "freeze" if the machine is not used for a while and, after some use, the brake needs readjustment.

Figure 1:
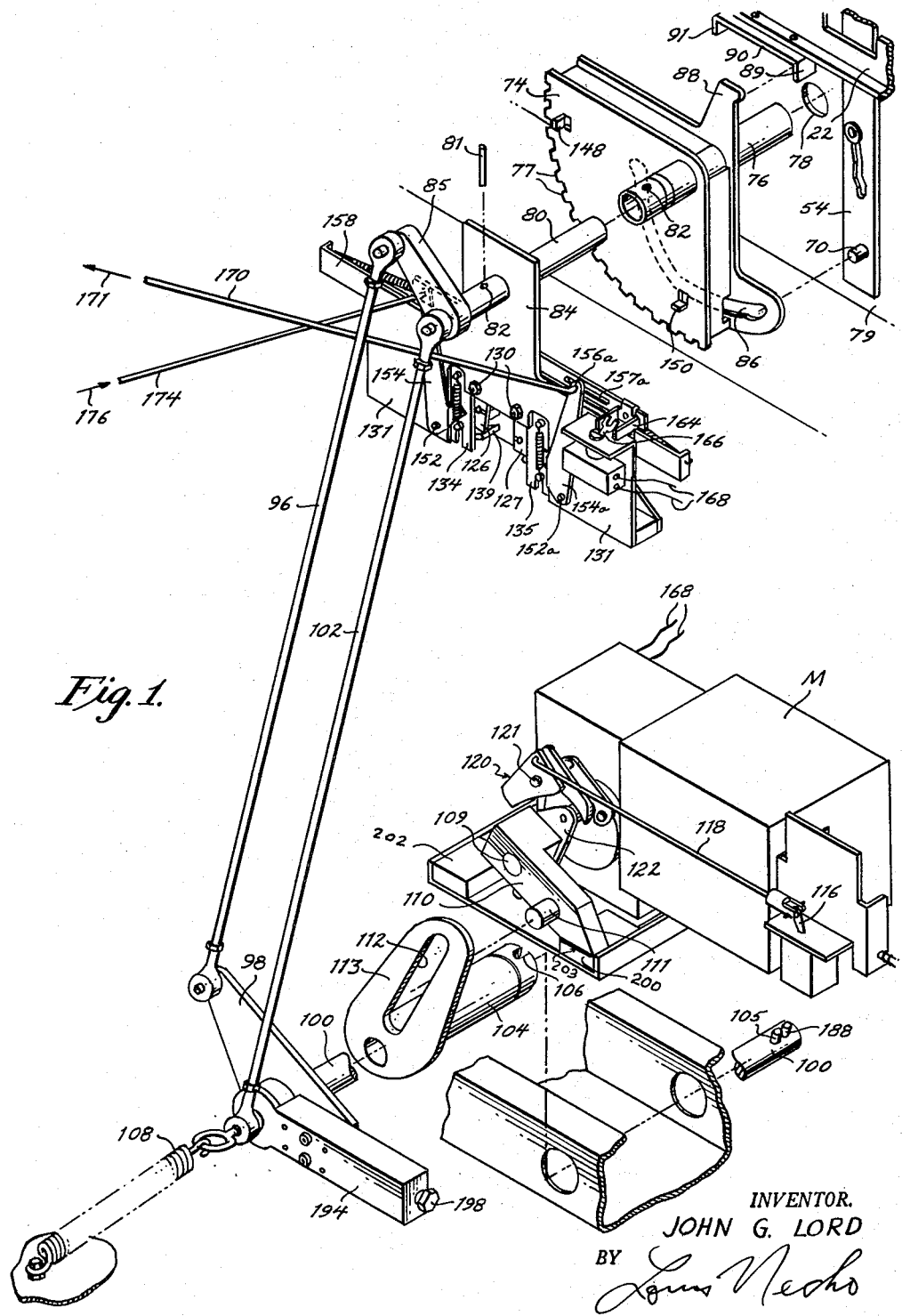
FIG. 1 is a perspective, exploded view showing the rotary quadrant referred to and the operating mechanism therefor.

To overcome these difficulties, the present invention includes rubber, or other resilient brake pads 200 and 202 which are located at the opposite ends of the arcuate movement of arm 110 on motor shaft 109, FIG. 1. By this arrangement, when the arm comes to rest on pad 200 or on pad 202, it stops rotation of shaft 109, and, hence, rotation of shaft 100 and, by synchronizing the positions of brake pads 200 and 202 relative to de-energization of the motor by switch 116, the "coasting," or rotation, of the motor shaft after the motor has been de-energized is eliminated. Also, when the motor is again energized, the compression of the pads (or springs, or other cushion) exerts a force against arm 110 in the direction in which the motor tends to move it and this decreases the load on the motor and makes for easier and quicker and more accurate operation.

The operation is as follows:

With the machine in the curtain-open position of FIG. 4, and a voter having entered the voting booth, the election officer pulls handle 170 in the direction of arrow 171 to move arm 154a to the positions of FIGS. 3 and 4 in which gear 74 can be rotated from the position of FIG. 3, in which the curtain was opened, to the position of FIG. 15, in which the curtain is closed. It will be remembered that the rotation of gear 74, in counter-clockwise direction, withdraws finger 88 from engagement with wall 89 of bracket 90 and permits spring 92 to move slide bar 22 to the left to allow rollers 18 to enter notches 24 and liberate voting spindles S. Also, this movement of gear 74 also raises bar 54 to engage, or activate, the vote counters. When the voter finishes voting, he pushes handle 174 to the position of FIG. 15 to open the curtain and to permit rotation of gear 74 from the position of FIG. 15 back to the position of FIG. 3. This lowers bar 54 to deactivate the counters so that they will not rotate in reverse with the downward movement of the handle-return members 10 and moves bar 22 to the right to immobilize the handle-return member. It will be appreciated that the officer's handle throws switch 166 to the position of FIG. 3 and this energizes motor M, which now turns in one direction, and that the voter's handle throws the switch to the position of FIG. 15, again to energize the motor, which now turns in the reverse direction.

From the foregoing, it will be seen that, by the use of gear 74, a very much narrower, lighter and less expensive machine can be built than when a long, longitudinally movable bar is used; that, in the present machine, the voter need only open the curtain when he finishes voting and that he does not have to close the curtain, as in the structures of the prior patents; that the rotation of gear 74 in one direction engages the counters through bar 54 and releases the handle-return members (through slide bar 22), and that opposite rotation of the gear disengages the counters and locks the handle-return members and, hence, the voting spindles; that the machine can be instantly converted from electrical to manual operation and that this can be done wholly from outside of the machine and without having to dismantle any part of the machine; that by safety attachment 194, the machine is protected against damage in case of any jamming which tends to resist the force of the motor or the force exerted during manual operation; that the rubber brakes 200 and 202, which are compressed by arm 110, as shown at 203, more accurately adjust the traverse of motor M than it could be adjusted by the mechanical brakes of the prior patents. Also, the tendency of the rubber brakes to resume their shape, that is, to push arm 110 upwardly, helps the motor to start turning shaft 109 as soon as it is energized by switch 116.

What I claim is:

1. A voting machine including a vote-casting mechanism, a locking and unlocking member movable to a first position in which the vote-casting mechanism is locked against use by a voter and to a second position in which the vote-casting mechanism is open for use by the voter, a gear segment, means operatively connecting said gear segment to said locking and unlocking member, a reversible motor operatively connected to said gear segment, a first motor activating means accessible to the voter only and operable to energize said motor to rotate said gear segment in one direction to move said locking and unlocking means to its first position, a second motor activating means accessible to the attendant only and operable to energize said motor to rotate said gear segment in the opposite direction to move said locking and unlocking member to its second position and additional locking devices selectively engageable with said gear segment and operable, upon rotation of said gear segment in either direction, respectively, to prevent spontaneous, reverse rotation of said gear segment, and means operatively connecting said locking device to said first and second motor activating means, respectively, whereby said locking devices are alternately released by operation of said first and second activating means, respectively.

2. A voting machine including a vote-casting mechanism, a locking and unlocking member movable to a first position in which said mechanism is locked against use by a voter and to a second position in which said mechanism is released for use by the voter, a gear, means operatively connecting said gear to said locking and unlocking member whereby, rotation of said gear in one direction, moves said member to its first position and whereby, rotation of said gear in the opposite direction, moves said member to its second position, a first actuating means for rotating said gear in said one direction, a first pawl engageable with said gear when the latter is rotated in said one direction to prevent spontaneous reverse rotation of said gear, a second actuating means for rotating said gear in the opposite direction, a second pawl engageable with said gear, when the latter is rotated in said opposite direction to prevent spontaneous reverse rotation of said gear, and means operatively connecting said pawls to said first and second actuating members, respectively, and operable, upon movement of said first and second actuating means alternately to disengage said pawls to permit alternate rotation of said gear in opposite directions.

3. The structure recited in claim 2 in which said gear has a cam slot formed therein and a vertically reciprocable vote counter control arm and means carried by said arm and engaging said slot whereby rotation of said gear reciprocates said arm.

4. The structure recited in claim 2 in which said gear has a finger which is engageable with said locking and unlocking member to move said locking and unlocking member to its first position upon rotation of said gear in said one direction, and a spring normally biasing said locking and unlocking member in the opposite direction.

5. In a voting machine of the type which includes a vote-casting mechanism and control means movable to a first position in which the vote-casting is locked and to a second position in which said vote-casting mechanism is unlocked, gear segment operatively connected with said control means, a rotary member driven by said shaft to either of two extreme positions, a reversible motor having a shaft, connecting means for engaging said shaft with said control means, means for controllably energizing said motor, said connecting means including an arm rigidly carried by and rotatable with said shaft, and a compressible resilient abutment located on opposite sides of said shaft and in the path of reciprocal movement of said arm for absorbing the momentum of said shaft and stopping its rotation as soon as the motor is de-energized and means connecting said arm with said rotary member for retaining said arm in compressive relation to said abutment when said rotary members is in either of its extreme positions and said motor is de-energized.

6. In a voting machine of the type which includes a vote-casting mechanism,
   a control member movable to a first position in which said vote-casting mechanism is inoperative and to a second position in which said vote-casting mechanism is operative,
   a gear having a cam slot therein,
   a pin carried by said member and engaging said slot whereby rotation of said gear in one direction moves said member to its first position and whereby rotation of said gear in the opposite direction moves said member to its second position and
   actuating means for alternately rotating said gear in opposite directions, said means including a reversible motor,
   a first, two-position switch for energizing said motor,
   a first actuating member operable by the voter exclusively to close said switch in one position thereof to energize said motor, a second switch operable by the rotation of said motor to de-energize the same, a second actuating member operable by the election officer exclusively for closing said switch in the other position thereof, to re-energize said motor.

References Cited in the file of this patent

UNITED STATES PATENTS

| | | |
|---|---|---|
| 1,072,939 | Gillespie | Sept. 9, 1913 |
| 1,399,038 | Valois | Dec. 6, 1921 |
| 2,054,102 | Shoup et al. | Sept. 15, 1936 |
| 2,241,485 | Shoup | May 13, 1941 |
| 2,281,603 | Shoup | May 5, 1942 |
| 2,541,529 | McVicker | Feb. 13, 1951 |
| 2,761,330 | Reichert | Sept. 4, 1956 |
| 2,935,166 | Dodsworth | May 3, 1960 |
| 3,096,017 | Wilcox et al. | July 2, 1963 |